United States Patent
Matousek et al.

(10) Patent No.: US 8,291,818 B2
(45) Date of Patent: Oct. 23, 2012

(54) BALER DENSITY CONTROL MECHANISM AND METHOD

(75) Inventors: Robert A. Matousek, Milan, IL (US);
Patrick Kendrick, Hesston, KS (US);
Jason Seeger, Newton, KS (US);
Lawrence D. Retzlaff, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 12/645,174

(22) Filed: Dec. 22, 2009

(65) Prior Publication Data

US 2011/0023731 A1    Feb. 3, 2011

Related U.S. Application Data

(60) Provisional application No. 61/230,381, filed on Jul. 31, 2009.

(51) Int. Cl.
*B30B 15/14* (2006.01)
*A01F 15/10* (2006.01)

(52) U.S. Cl. ............ 100/189; 100/50; 100/142; 56/341

(58) Field of Classification Search ............... 100/142, 100/189, 215, 50; 56/341
See application file for complete search history.

(56) References Cited

U.S. PATENT DOCUMENTS

| | | | |
|---|---|---|---|
| 3,552,109 A * | 1/1971 | Murray et al. | 56/343 |
| 4,117,775 A * | 10/1978 | White et al. | 100/19 R |
| 4,135,444 A | 1/1979 | White et al. | |
| 5,467,702 A * | 11/1995 | Naaktgeboren et al. | 100/35 |
| 6,385,952 B1 * | 5/2002 | Bergkamp et al. | 56/341 |
| 6,474,228 B1 * | 11/2002 | Leupe et al. | 100/45 |
| 6,915,736 B2 * | 7/2005 | Leupe et al. | 100/45 |
| 2001/0042362 A1 * | 11/2001 | Scarlett et al. | 56/10.2 G |

FOREIGN PATENT DOCUMENTS

FR      2882623      9/2006

OTHER PUBLICATIONS

International Search Report for International Applicaiton No. PCT/IB2010/001797 Dated Jun. 12, 2010.

* cited by examiner

*Primary Examiner* — Jimmy T Nguyen

(57) ABSTRACT

A method of electronically sensing the fill of material in a stuffer chute and tripping a stuffer of a baler. A combine harvester and baler for biomass collection. In one embodiment, crop material such as the residue or material other than grain (MOG) from the back of the combine is directly projected toward a target on a baler collection device. A tailboard with defection panels may be used to alter the direction of the crop residue from the combine. The tongue of the baler is configured to not obstruct the crop material as the crop material is projected toward the baler. One or more knives of a chopper coupled to the combine may be configured to optimally project MOG toward the baler. Also, the stuffer chute of the baler may be configured to facilitate the flow of crop material such as MOG and therefore minimize obstructions. The crop material is transferred from the combine to the baler without the use of a conveyor.

7 Claims, 15 Drawing Sheets

BALER DENSITY CONTROL MECHANISM AND METHOD

CROSS REFERENCE TO RELATED APPLICATIONS

This application claims priority to co-pending U.S. provisional application No. 61/230,381 filed Jul. 31, 2009, entitled "COMBINE HARVESTER AND BALER FOR BIOMASS COLLECTION", which is entirely incorporated herein by reference.

The present U.S. nonprovisional application is related to U.S. nonprovisional application entitled application Ser. No. 12/644,355 "BIOMASS BALER", to U.S. nonprovisional application Ser. No. 12/644,505 entitled "BALER TONGUE FOR COLLECTING BIOMASS", to U.S. nonprovisional application Ser. No. 12/644,643 entitled "BALER COLLECTOR FOR COLLECTING BIOMASS FROM A COMBINE HARVESTER", to U.S. nonprovisional application application Ser. No. 12/644,813 entitled "BALER PICKUP FOR COLLECTING BIOMASS FROM A COMBINE HARVESTER", to U.S. nonprovisional application Ser. No. 12/644,913 entitled "BIOMASS DEFELCTOR", to U.S. nonprovisional application Ser. No. 12/644,983 entitled "METHOD FOR PROJECTING BIOMASS FROM A COMBINE HARVESTER", to U.S. nonprovisional application Ser. No. 12/645,084 entitled "COMBINE CHOPPER FOR FEEDING A BALER", and to U.S. nonprovisional application Ser. No. 12/645,247 entitled "USER INTERFACE WITH BIOMASS DEFELCTION INFORMATION", which are incorporated herein by reference, and having been filed concurrently with the present application.

TECHNICAL FIELD

The present disclosure relates generally to combine residue and collection for biomass fuel production.

BACKGROUND

The combine harvester, or simply combine, has a history of development directed toward combining several operations into one complete machine. The combine completes these operations in one pass over a particular part of the field. Early combines were pulled through the fields by teams of horses or mules. Today, combines utilize GPS and auto-steering, but baling is typically performed as an additional step after the harvesting. After the combining operations are completed, a separate baler towed by a tractor is required to gather cut crops such as plant stalks from the field to form the plant stalks into round or square bales. Biomass fuels such as straw, hay or cereals may be pressed into bales to increase their energy density. The bales are subsequently picked up and trucked to where they are needed. What is needed is an improved means of combining the baling operation along with the operations of the combine harvester so that the crop may be harvested and the residue baled in a single pass of a combine harvester.

DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided to make this disclosure thorough and complete, and to fully convey the scope of the invention to those skilled in the art. The present invention is described more fully hereinbelow.

Figure 1:
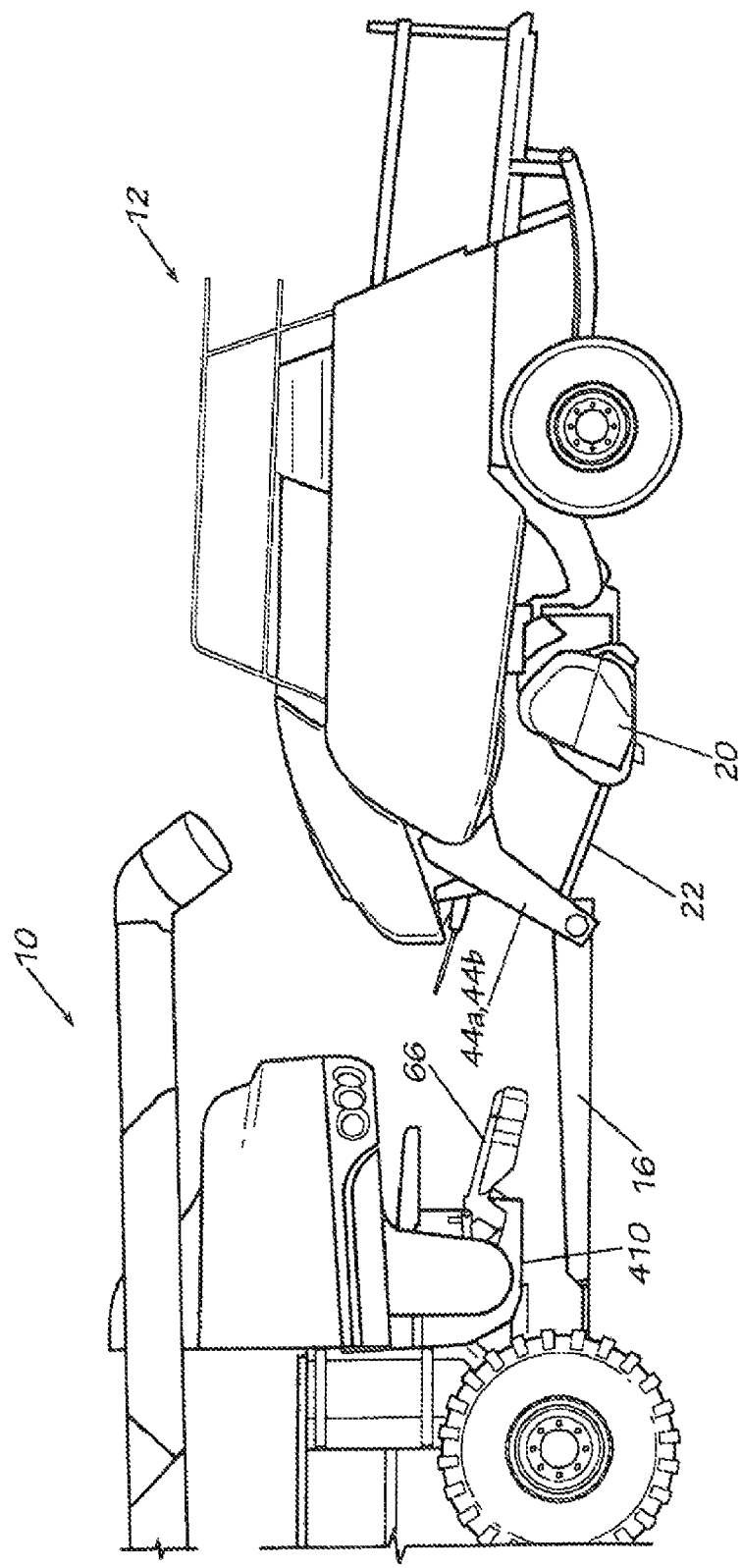
FIG. 1. is a partial side view of a combine harvester and a side view of a baler towed by the combine harvester.
Figure 2:
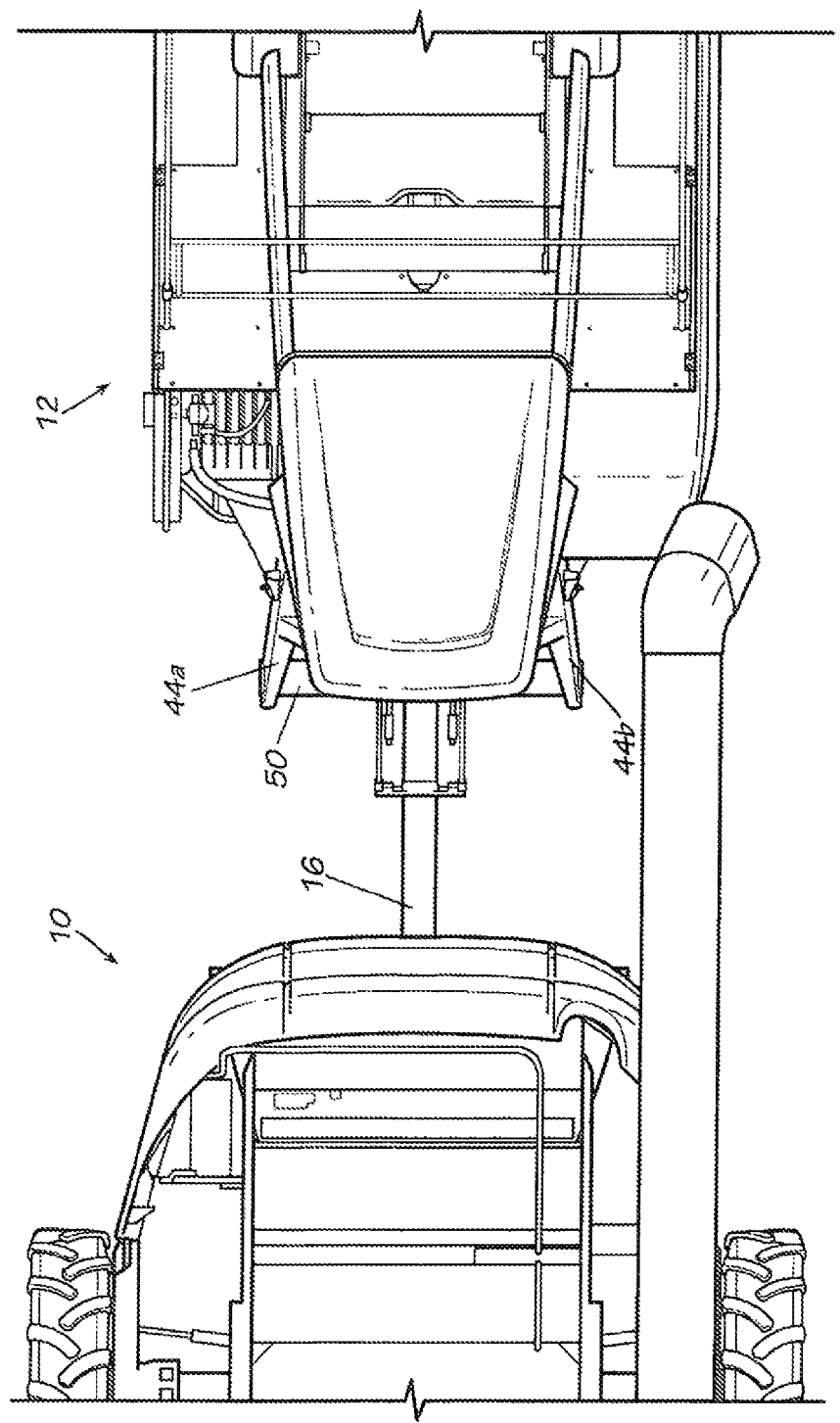
FIG. 2 is a top view of the combine and towed baler of FIG. 1.
Figure 3:
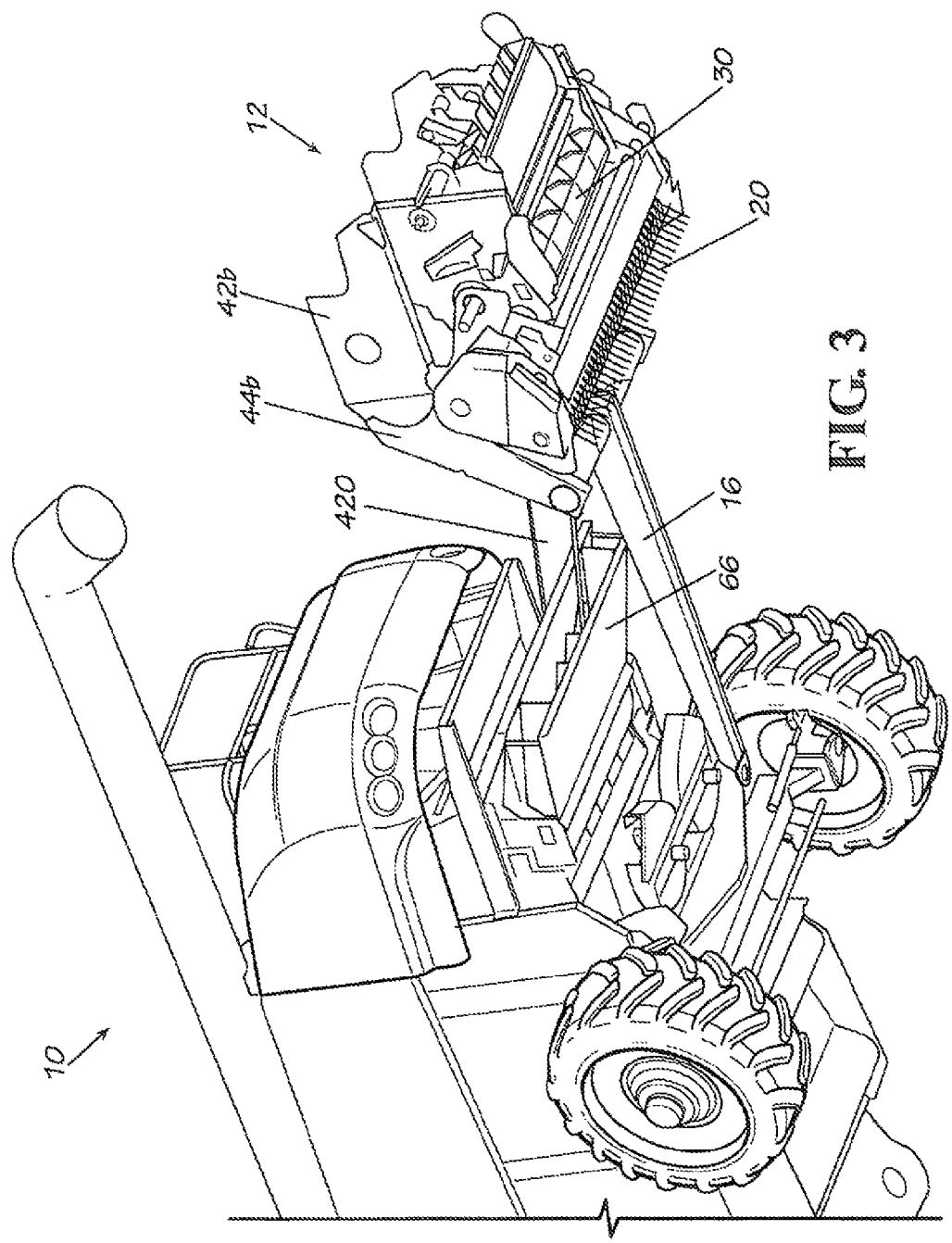
FIG. 3 is a bottom perspective view from the rear of the combine and towed baler of FIG. 1.

FIGS. 1-3 illustrate a combine 10 towing a baler 12 according to one embodiment of the present invention. The baler 12 is pivotally attached to the rear of the combine 10 via a tongue 16 which is coupled to the hitch point on the back of the combine 10. The baler 12 is preferably powered by a hydrostatic motor affixed to the flywheel of the baler 12 drawing its power source from the engine of the combine 10 via a hydrostatic pump.

The tongue 16 is attached to the chassis or main frame of the baler 12. The chassis is made of steel frame construction. As best shown in FIGS. 4-9, the tongue 16 is configured to be coupled to the combine 10 so that when the crop material from the combine 10 can be transferred from the combine 10 directly to the baler 12 without redirection through the air by the combine and without the use of a conveyor coupled to either the combine 10 or the baler 12. The term "crop material" is intended to include grain and/or material other than grain (MOG), such as crop residue from the combine 10. Moreover, the tongue 16 and the chassis of the baler 12 are configured to the flow of crop material therethrough as described below. The crop material from the combine 10 preferably is directly discharged from the combine 10 to the baler 12. Also, the crop material from the combine 10 does not need to be oriented or moved upward from the back of the combine 10 in order to be transferred to the baler 12 or any other secondary vehicle according to an embodiment of the present invention.

The crop material from the combine 10 is projected to a target defined by the baler 14. As best shown in FIGS. 4, 7, 8 and 10, the target may be a baler collection device or feeding mechanism such as a pickup 20, and/or a collector such as a transfer pan 22. Pickup 20 may be a rotating drum-type mechanism with flexible tines or teeth for lifting and conveying material from the ground to the baler 12. The pickup 20 may be mounted to the chassis of baler 12 for pivoting movement about an upwardly and rearwardly disposed transverse pivot axis. In one or more embodiments, at least a portion of crop material may be directly received from the combine 10 at the baler 12 without a pickup 20. As best shown in FIG. 11, at least a portion of the crop material may be directly discharged to a transfer pan 292 in front of the packer 276 which prevents crop material that is thrown to the packer from falling to the ground. Packing forks 282 can grab at least a portion of the crop material collected on the transfer pan 292 and move the crop material back to the stuffer chute 90.

Also, if desired, crop material may also be lifted or received from the ground with the pickup 20. The pickup 20 may be either configured to receive material directly from the ground or directly from the combine 10. However, it is preferable not to mix crop material received directly from the combine 10 with crop material received from the ground because of the dirt and other contamination that occurs when crop material is on the ground. Introducing dirt into the bale can cause significant issues in a fuel conversion process. The crop material on the ground may be from the combine 10 towing the baler 12 or some other vehicle. A portion of crop material received directly from the combine 10 may be discharged from the same location on the combine 10 as any other portion of crop material discharged onto the ground to be picked up by the pickup 20 of the baler 12. However, in one or more embodiments, the combine 10 may have a chaff spreader as best shown in FIG. 3 where at least a portion of the chaff may be directed into the trajectory of the crop material coming out from the combine 10 and the tailboard 66. In another embodiment, the chaff can be directly discharged by the chaff spreader onto the baler 12. For example, the chaff may be received and collected on the transfer pan 22 for the pickup 20 or on the transfer pan 292 for the packer 276.

In one or more embodiments, air may be used to direct crop material collected on either of the transfer pans 22, 292 into the pickup 20 or just the packer 276 when the pickup 20 is not used. To much crop material on the transfer pans 22, 292 may become an obstruction and therefore could prevent additional crop material from being collected and baled as desired. The transfer pans 22, 292 may include one or more openings or apertures for passing pressurized air therethough at the collected crop material. Preferably, the pressurized air comes from the baler 12 itself by using a hydraulic motor that spins a fan such as the hydraulic driven fans known to be used on balers to keep knotters free of debris. The air may be passed through one or more passageways or tubes extending to the apertures in the surfaces of the transfer pans 22, 292. At least a portion of the transfer pans may be hollow. Preferably the apertures are configured to pass air upward from the surface of the transfer pans 22, 292 and backward at an angle toward the pickup 20 and/or packer 276. In another embodiment, the air could be directly blown at the crop material from the passageways or tubes. The direction of at least a portion of the air flow can be reoriented while the crop material is being collected. In another embodiment, at least a portion of the air flow can be used to clear the crop material from the transfer pans 22, 292 when the portion of crop material collected on the transfer pans is not to be picked up by the pickup 20 or to be packed by the packer 276. More example, a portion of the crop material may be stuck and obstructing other crop material from being received on the transfer pans 22, 292.

Preferably the transfer pan 22, 292 is coupled to the baler 10 in such a manner that the collected crop material is permitted to slide across the transfer pan. 22. Also, the transfer pan 22 may be permitted to bounce somewhat when impacted by the crop material or as a result of the baler 12 advancing along the ground behind the combine 10. The bouncing allows at least a portion of the crop material to impact the transfer pan 22, 292 and then convey or funnel at least a portion of the crop material toward the pickup 20 or toward the packer 276. Preferably, the transfer pan 22 directs the crop material onto the pickup 20. The transfer pan 22, 292 may be coupled to the baler by springs or chains 26, or a combination thereof. The shape and configuration of either of the transfer pans 22, 292 as well as the length of the chains 26 can be adjusted or the type of springs can be changed as needed to suit particular crops or conditions.

Figure 9:
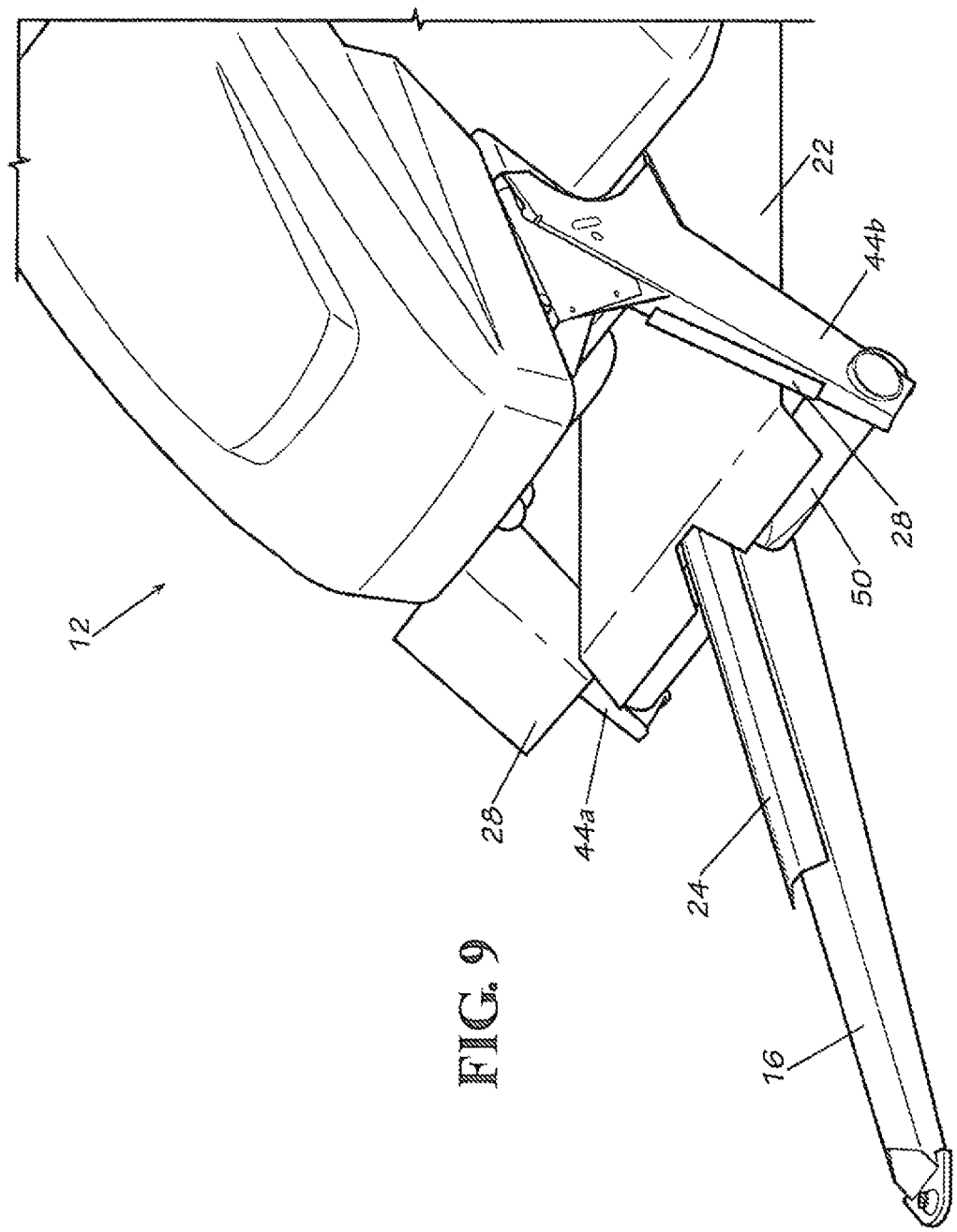
FIG. 9 is a top perspective view from the front of the towed baler with a transfer pan according to an alternative embodiment.

The transfer pans 22, 292 may also have an elongated portion 24, as best shown in FIG. 9, extending over the draw bar portion of the tongue 16 to protect electrical and/or hydraulic lines extending forward of the cross member 50 along the length of the tongue 16 from the impact of the crop material from the combine 10 intended for the baler 12. The electrical and hydraulic lines may run along the top of the tongue 16 or within the tongue 16 itself. In either case, the elongated portion 24 shields the electrical and hydraulic lines. Thus, the elongated portion 24 is a protective member and not intended for receiving material. The elongated portion 24 may be an integral part of the transfer pans 22, 292 or may be a separate part extending from the remainder of the transfer pans 22, 292 intended for receiving material from the combine 10. The elongated portion may extend almost the entire length of the tongue 16 or only a portion thereof.

Also, as shown in FIG. 9, one or more deflector panels 28 coupled to the baler 12 can be utilized to deflect the crop material from the combine 10 inward to the transfer pans 22, 292. The deflector panels 28 may be fastened to either side of the forward frame members 44a, 44b but are preferably fastened to the inside of the forward frame members 44a, 44b and extend in a forward manner from the forward frame members 44a, 44b. The deflector panels 28 may have a length generally corresponding with the length of the forward frame members 44a, 44b extending above the transfer pans 22, 292. Each of the deflector panels 28 may have two portions angled relative to one another where outer portions of the deflector panels 28 extend outward from the forward members 44a, 44b, and the inner portions are fastened to the side of the forward frame members 44a, 44b.

Figure 10:
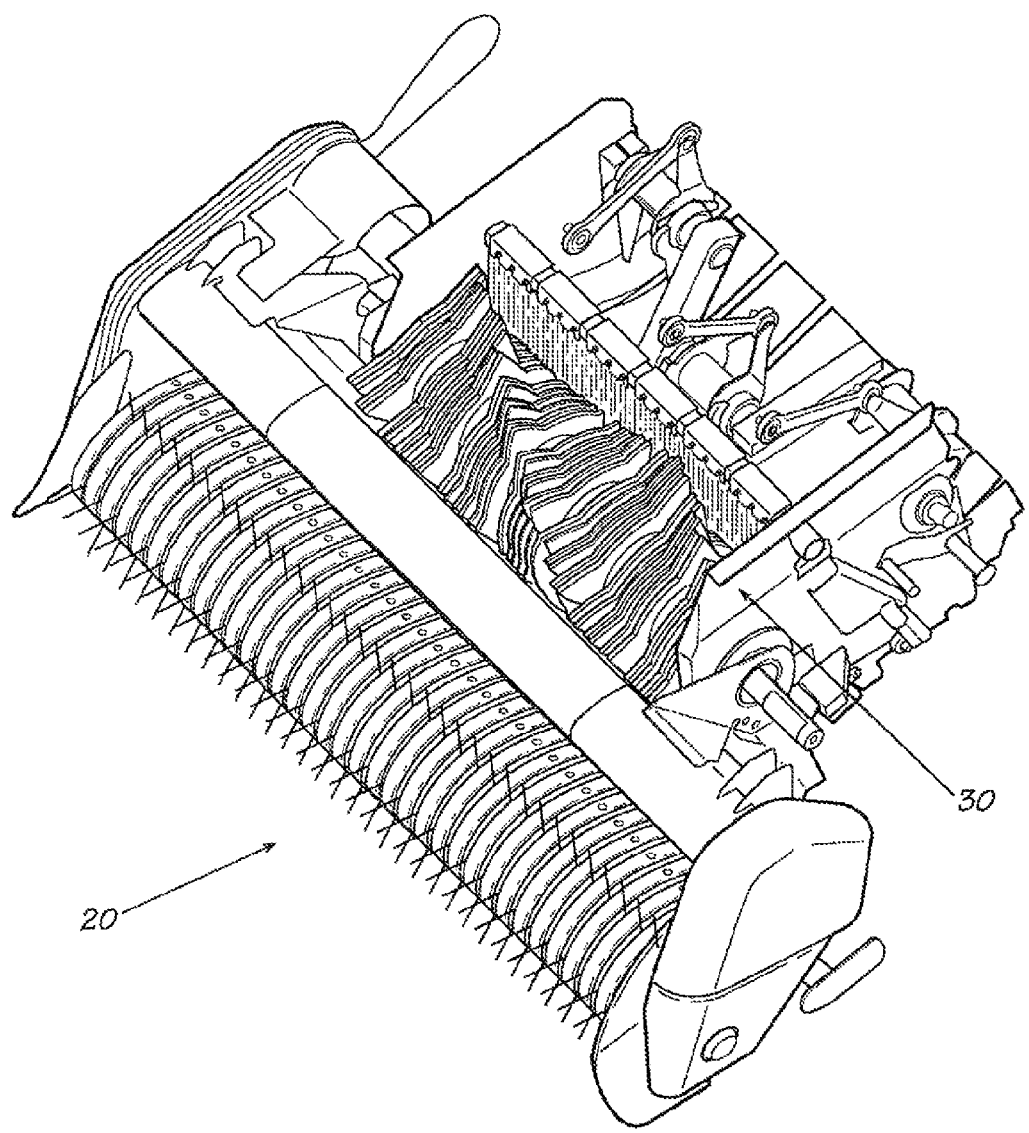
FIG. 10 is a close-up view of the pickup of the baler in combination with a cutter.
Figure 11:
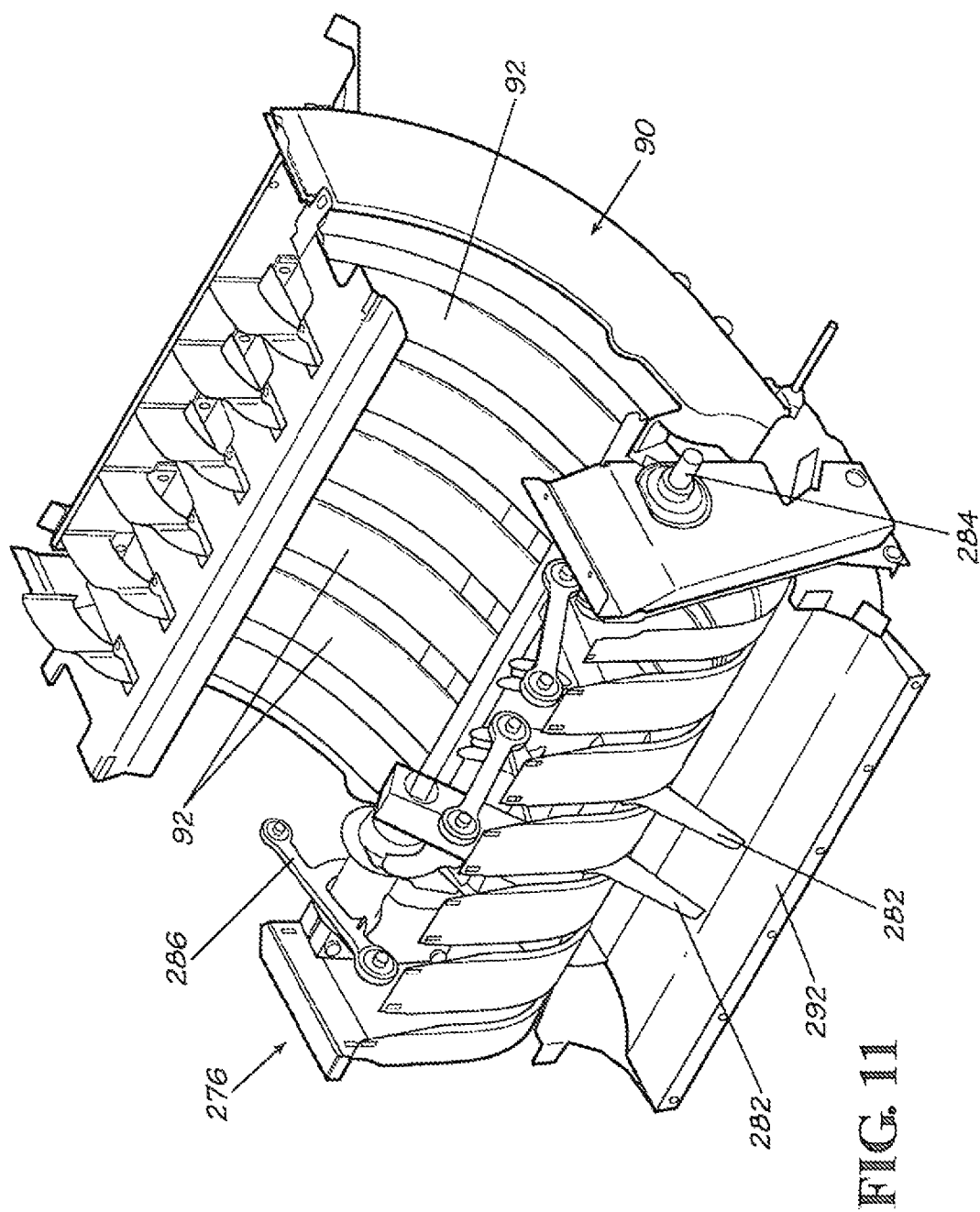
FIG. 11 is a front perspective view of a packer and stuffer chute of the baler.
Figure 12:
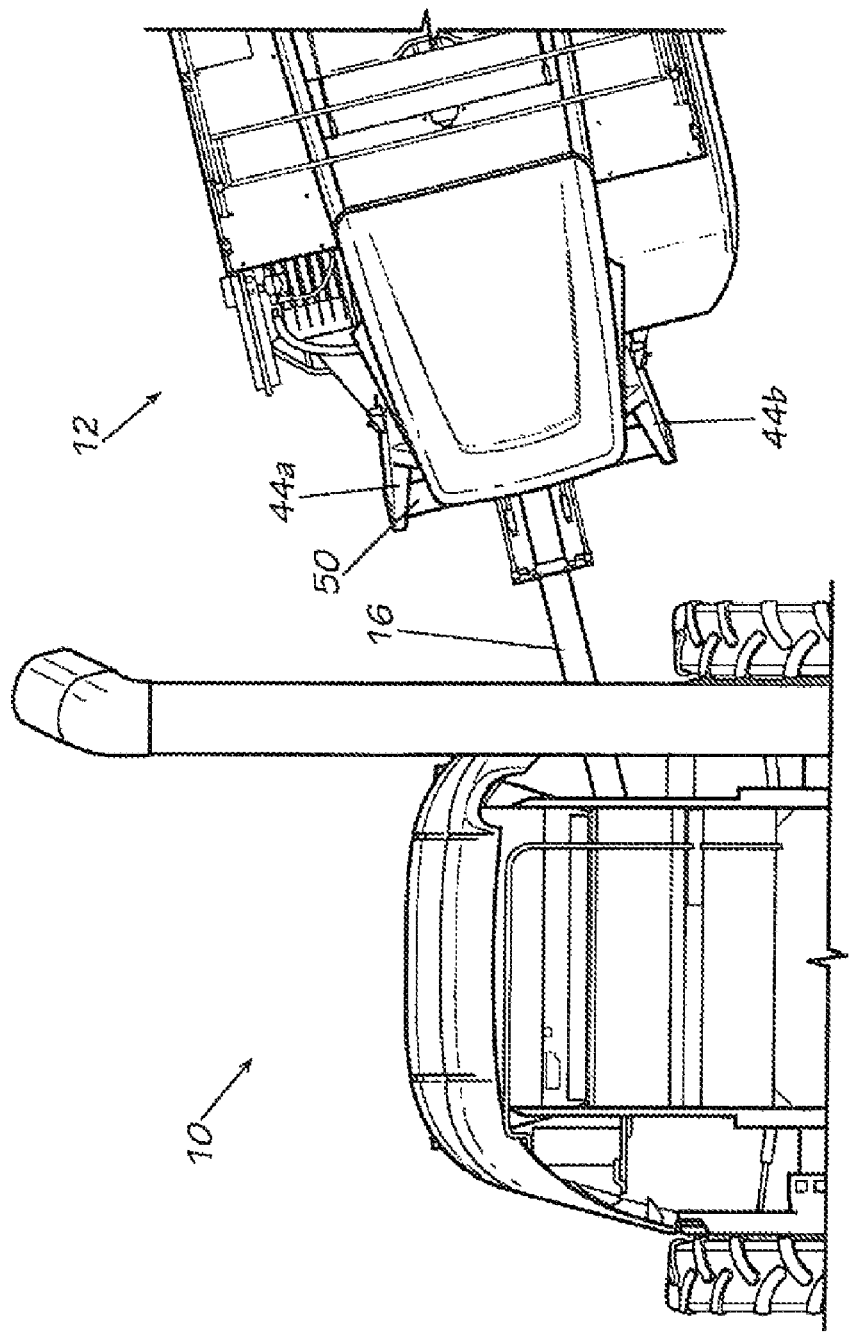
FIG. 12 is a top view of the baler and towed baler of FIG. 1 where the combine is turning.

As best shown in FIGS. 3 and 10, the baler 12 may include a cutter 30 positioned after the pickup 20 and before the packer 276 to reduce the distance the crop material must travel from the combine 10 before it is baled. As a result of using a cutter 30 in between the pickup 20 and the packer 36, the pickup 20 is moved forward toward the tongue 16, compared with when using just a pickup 20 on conventional balers, so that the distance between the back of the combine 10 and the target on the bailer 12 is reduced. By positioning the cutter 30 in between the pickup 20 and the packer 36, the pickup 20 and transfer pan 22 may be moved forward approximately eighteen inches or more. Alternatively, the length of some tongues 16 may be adjusted mechanically to obtain the desired distance between the back of the combine 10 and the baler 12. FIG. 12 shows the combine 10 turning but the length and shape of the tongue 16 is sufficient to preclude the tongue 16 or baler 12 from impacting the combine 10.

In another embodiment, the baler 12 may include a rotary feeding mechanism rather than the cutter 30. A rotary feeder is distinguishable from the cutter 30 in that the blades are different and that on some occasions it is not desirable to cut the crop material any further than it already has been. On such occasions though it may be desirable to merely feed the crop material with the rotary feeder into the packer 276.

Figure 4:
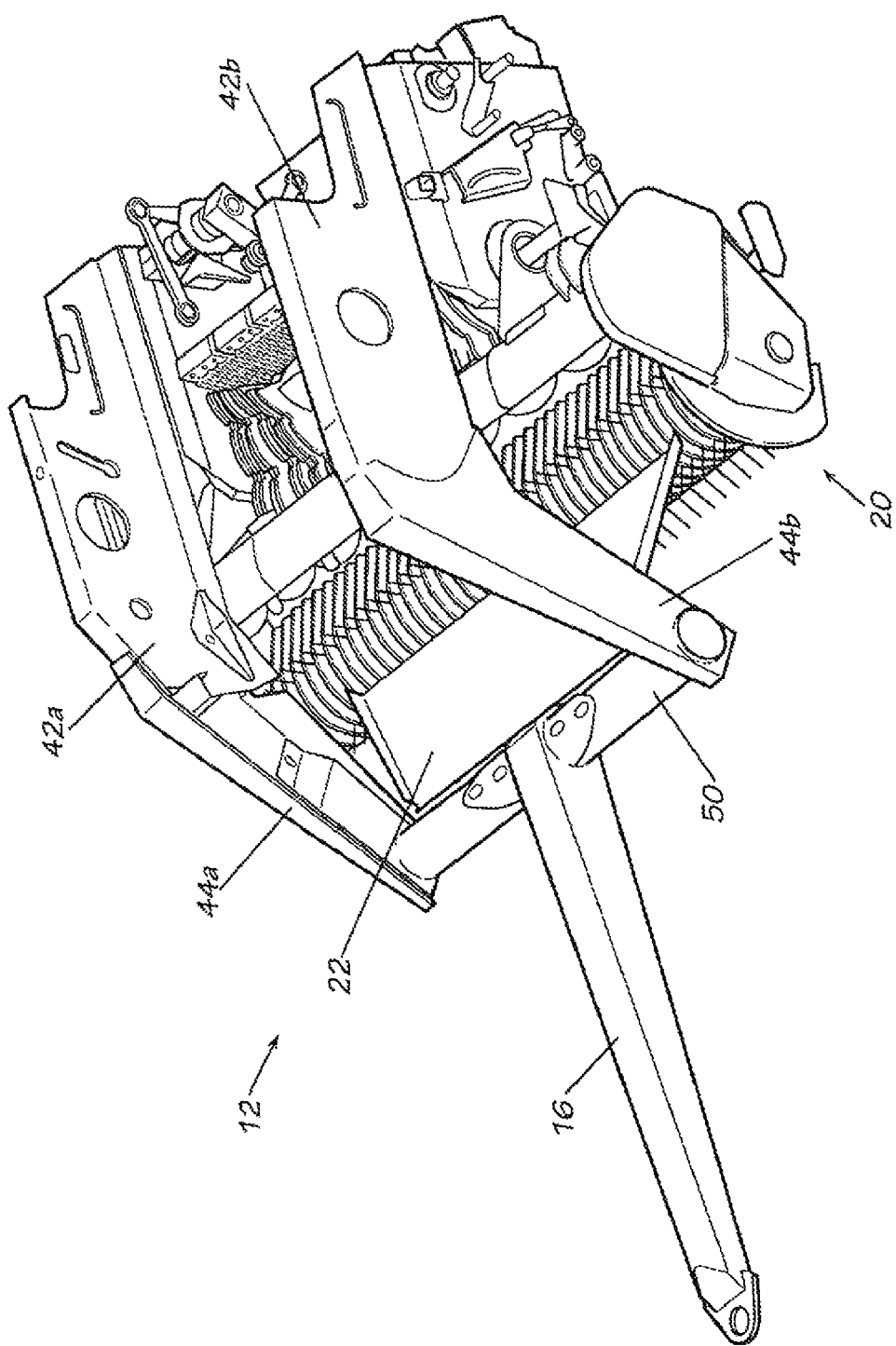
FIG. 4 is a partial top perspective view from the front of the frame and tongue of the towed baler with a transfer pan and a pickup.
Figure 5:
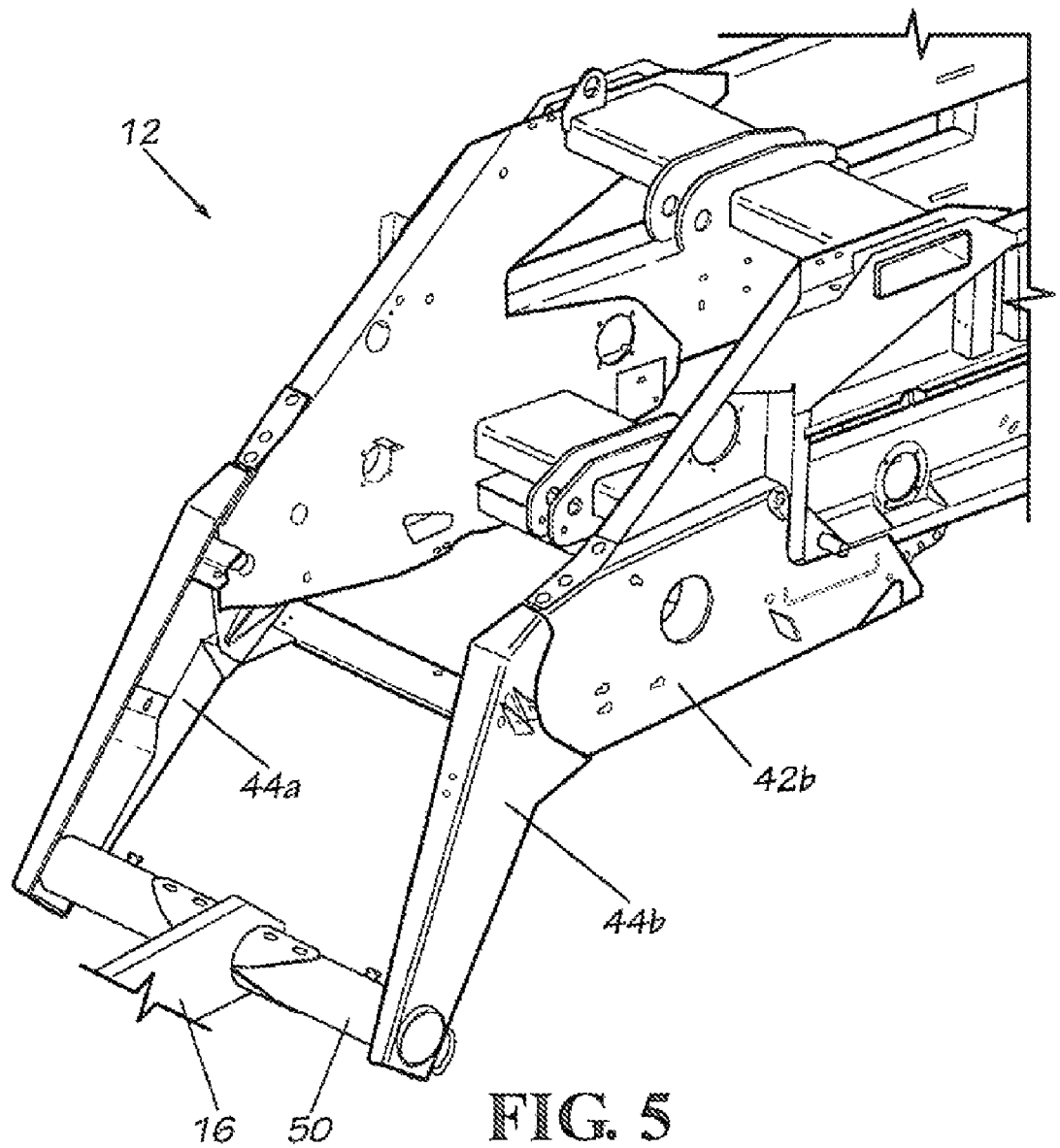
FIG. 5 is a is partial top perspective view from the front of the frame of the towed baler without the transfer pan and pickup.
Figure 6:
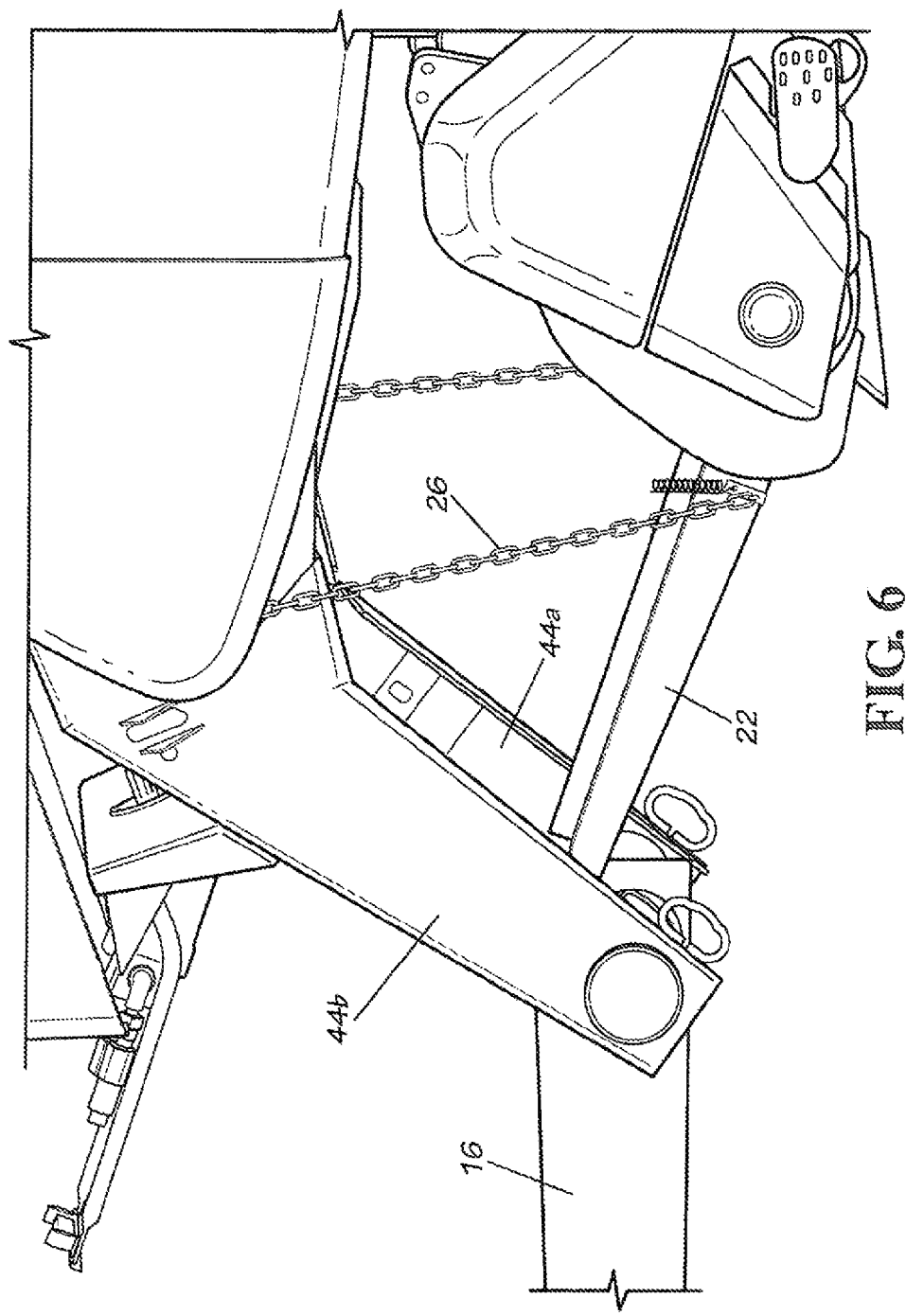
FIG. 6 is a close-up side view of the transfer pan.
Figure 7:
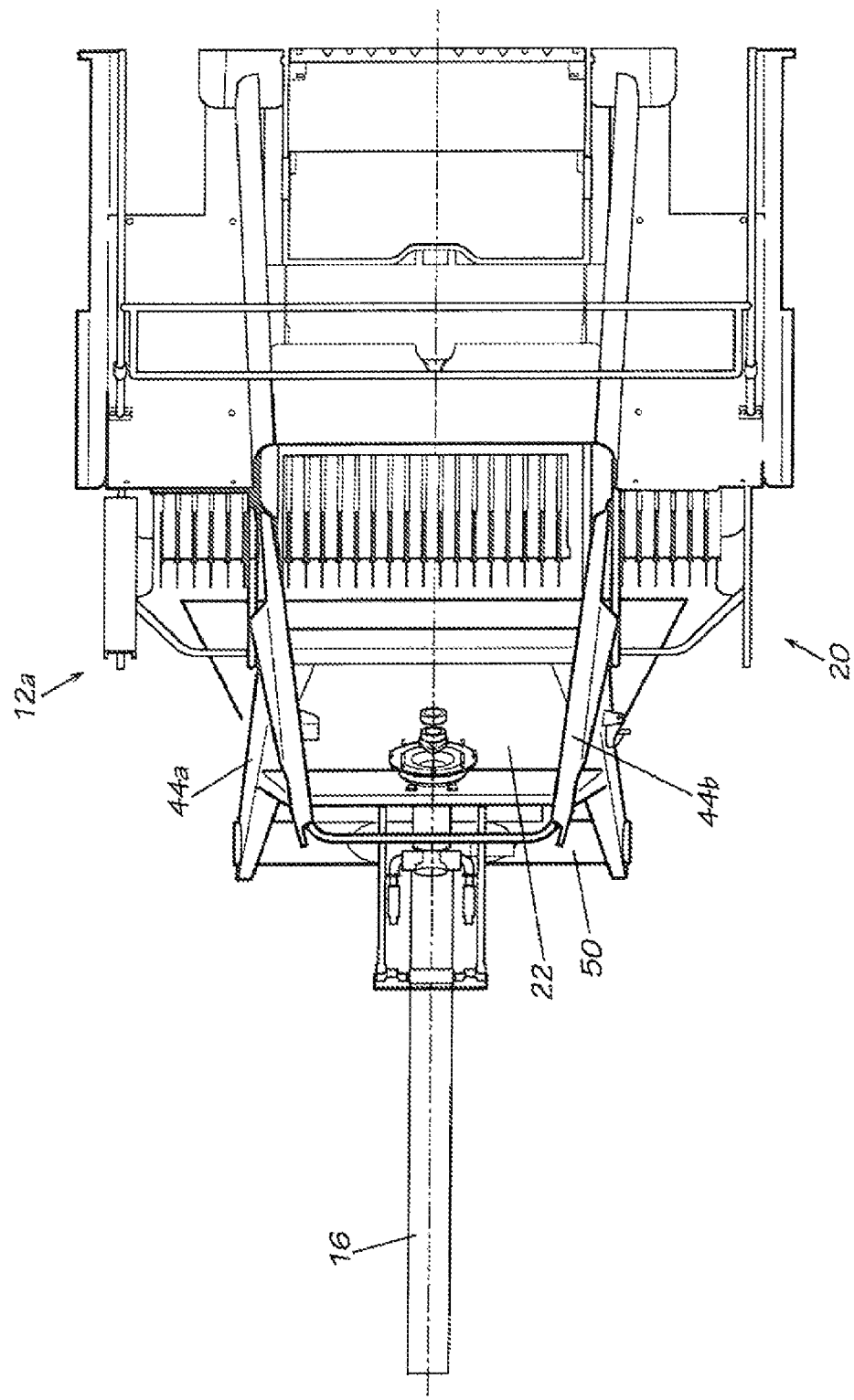
FIG. 7 is a top view of the towed baler of FIG. 4 with the transfer pan and pickup.
Figure 8:
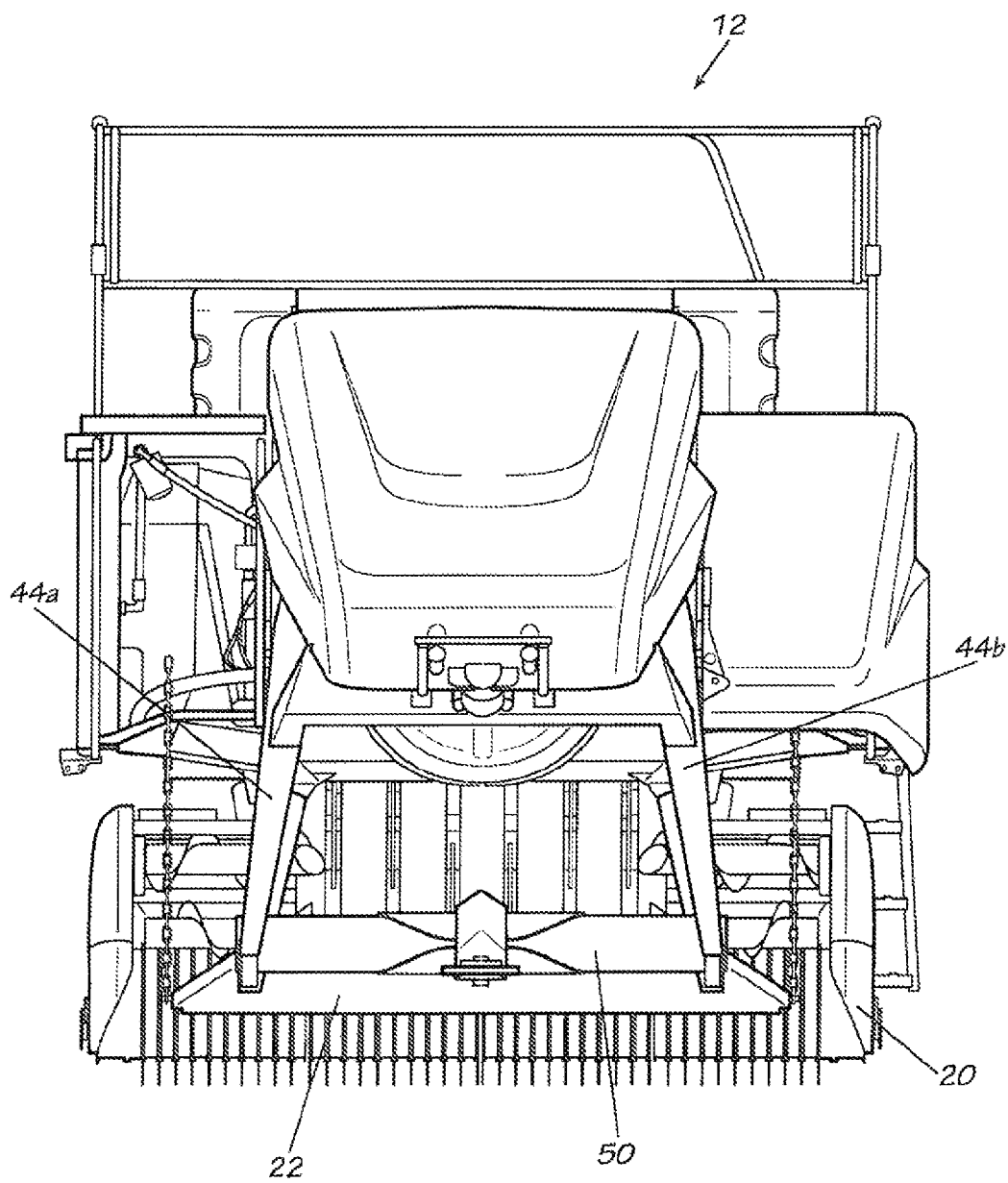
FIG. 8 is a front view of the towed baler of FIG. 4 with the transfer pan and pickup.

FIGS. 4 and 5 best depict a cutaway of a portion of the baler 12. Side frame portions 42a, 42b are similar to those used on conventional balers with conventional tongues adapted to be towed behind tractors. However, the main frame of baler 12 is modified from those of conventional balers because the baler 12 includes two forward frame members 44a, 44b. Each of the forward frame members 44a, 44b is connected at its upper end to an end of one of the side frame portions 42a, 44b and extends downward from the main frame. The lower ends of the two forward frame members 44a, 44b are preferably oriented slightly forward of the pickup 20 and in front of the point to which they attach to the side frame portions 42a, 42b. Moreover, the lower ends may be flared outwardly relative to one another, as best shown in FIGS. 2, 7 and 8, with a cross member 50 connected in between each lower end of the forward frame members 44a,44b. The cross member 50 and the draw bar portion of the tongue 16 define generally a T-shaped tongue which is distinguishable from common U-shaped tongues in use today with conventional balers. The forward frame members 44a, 44b are oriented alongside one another to define an opening therebetween and above the cross member 50. Because the lower ends of the forward frame members 44a, 44bb are flared outwardly, the opening is wider at its bottom adjacent the cross member 50 than the opening is at its top adjacent to where the forward frame members 44a, 44b join side frame portions 42a, 42b. Moreover, the configuration of the tongue 16 allows for greater visibility into the pickup 20 of the baler 12. The tongue 16 also permits flow of crop material directly from the ground as conventional balers do or directly from the combine 10 without either being obstructed by the tongue 16.

Figure 13:
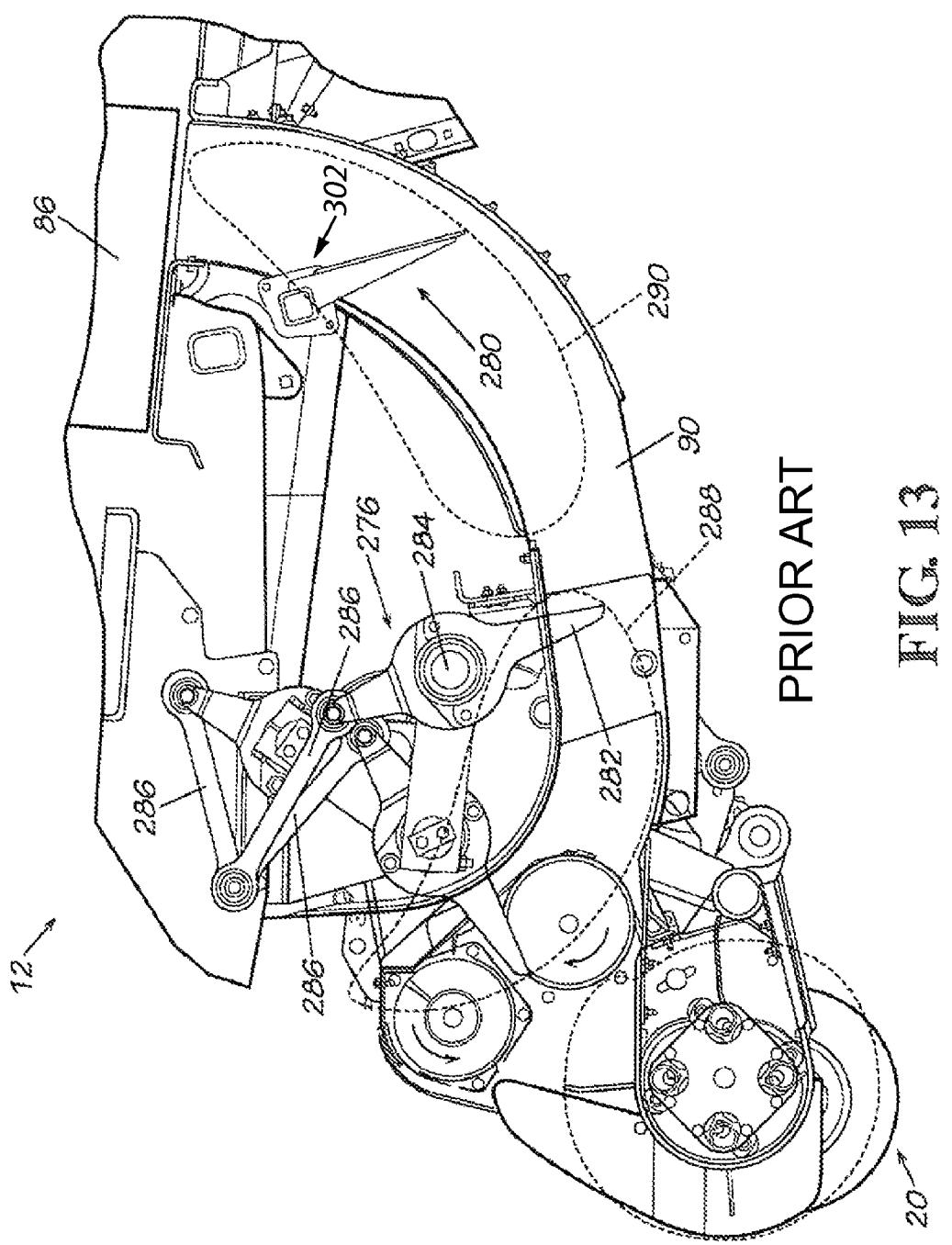
FIG. 13 is a partial side view of the baler showing the packer and stuffer chute.

The baler 12 may include a conventional density control mechanism broadly denoted by the numeral 302. The stuffer chute 90 is sometimes referred to as a duct, passage, charge chamber or prechamber. As best shown in FIG. 13, the stuffer chute 90 defines an internal passage through which the crop material travels from pickup 20 to baling chamber 86 during operation of the baler 12. The front end of the stuffer chute 90 is open to present an inlet. An outlet for the stuffer chute 90 is defined by an opening into the baling chamber 86. Flake delivered to the baling chamber 86 is compressed by a reciprocating plunger. At least a portion of a top wall of the stuffer chute 90 is defined by a series of laterally spaced apart straps 92 shown in FIG. 14 that extend downwardly and forwardly from baling chamber 86 and terminate in forwardmost upturned front ends generally above the inlet. The rear of pickup 20 has a centrally disposed discharge opening, in fore-and-aft alignment with the inlet to the stuffer chamber 90.

Baler 12 further comprises a feeding mechanism for moving crop materials through stuffer chute 90. The feeding mechanism may, for example, comprise a suitable rotor associated with a cutter mechanism, or it may comprise other apparatuses. In the illustrated embodiment, the feeding mechanism includes a packer broadly denoted by the numeral 276 and a stuffer broadly denoted by the numeral 280 as best shown in FIG. 13. As is conventional and well understood by those skilled in the art, packer 276 may include a plurality of packing forks 282 that are mounted along a crankshaft 284 and controlled by control links 286 for moving the tips of packing forks 282 in a generally kidney-shaped path of travel 288 as illustrated in FIG. 13. Packer 276 is thus used to receive materials from pickup 20 and pack the same into stuffer chute 90 for preparing a precompressed, preshaped charge of crop materials that conforms generally to the interior dimensions of stuffer chute 90 while the opening to the baling chamber 86 is closed by the reciprocating plunger 88.

The stuffer 280, as is conventional and well understood by those skilled in the art, functions to sweep through its own kidney shaped path of travel 290 as illustrated in FIG. 13 to sweep the prepared charge up into baling chamber 86 between compression strokes of plunger 88 when the opening to the baling chamber 86 is uncovered. A conventional density control mechanism that includes a stuffer sensor door in the floor of the stuffer chute 90 functions in a manner well understood by those skilled in the art to check the density of each charge forming within the stuffer chute and to cause the stuffer 280 to pause in the event that a charge having predetermined characteristics has not accumulated within stuffer chute 90 by the next time stuffer 280 would normally sweep the charge up into the baling chamber 86. The conventional density control mechanism in the floor of the baler 12 causes the stuffer 280 to dwell for one or more successive stuffing strokes in the event the charge accumulating within stuffer chute 90 has not reached the shape and density desired. The principles of operation of the stuffer 280 are well understood by those skilled in the art.

The baler 12 may include an improved density control mechanism 300 that also functions in a manner to check the density of each charge forming within the stuffer chute 90 and to cause the stuffer 280 to pause in the event that a charge having predetermined characteristics has not accumulated within stuffer chute 90. The density control mechanism 300 includes a stuffer clutch assembly 310 and a sensor or trigger such as trigger assembly 320 positioned through one or both sidewalls of a stuffer chute 90. A conventional stuffer sensor door in the floor of the stuffer chute 90 may be replaced with the trigger assembly 320 thereby eliminating any possible interruptions in the flow of crop material through the stuffer chute 90. The stuffer sensor door creates interference or friction and now with the reduced interference and friction within the stuffer chute 90 the crop material such as MOG gets to the top of the stuffer chute 90 more easily to complete a fully filled flake.

Figure 14:
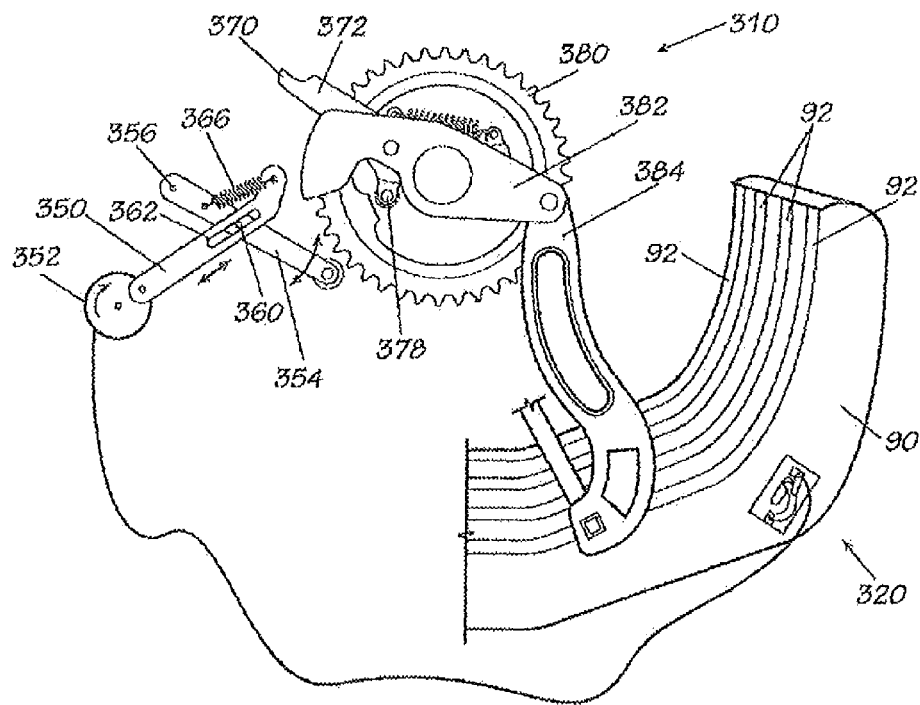
FIG. 14 illustrates a density control mechanism according to one embodiment of the present invention.
Figure 15:
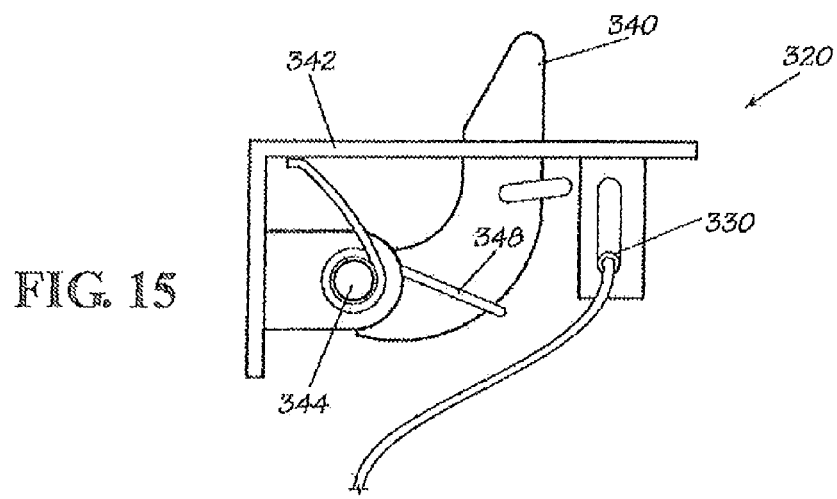
FIG. 15 illustrates a trigger assembly of the density control mechanism of FIG. 14.

The trigger assembly 320 may be positioned in various places along either side of the stuffer chute 90 depending on the type of crop material and depending on what conditions exist. Preferably, the trigger assembly 320 is positioned approximately halfway up the side of the stuffer chute 90 as best shown in FIG. 14 to accommodate most crops materials and conditions. However, the trigger assembly 320 may be slidably attached in a slot positioned along a portion of the length of the side of the stuffer chute 90 so that the trigger lever assembly 320 may be repositioned at times according to the crop materials being baled or the conditions. Also, preferably trigger assemblies 320 are positioned on both sidewalls of the stuffer chute 90 so that either may be triggered. The trigger assembly 320 senses the flake in the stuffer chute 90 and trips when the stuffer chute 90 is full or when the desired amount of flake is present and the flake is ready to be moved to the baling chamber 86. FIG. 15 shows the orientation of a trigger lever 340 of one embodiment of the trigger assembly 320 when the trigger lever 340 extends though an opening of a bracket 342 and into the interior of the stuffer chute 90 through an opening in the sidewall of the stuffer chute 90. Preferably, the trigger lever 340 extends approximately three to six inches into the interior of the stuffer chute 90 but the length of the trigger lever 340 may be adjusted to any suitable length to accommodate the crop and conditions. The trigger lever 340 is coupled to a spring 348 to bias the distal end of the trigger lever 340 pivoting about axis 344 into the opening in the sidewall of the stuffer chute 90. The size of the spring 348 may determine the size of the charge.

Figure 16:
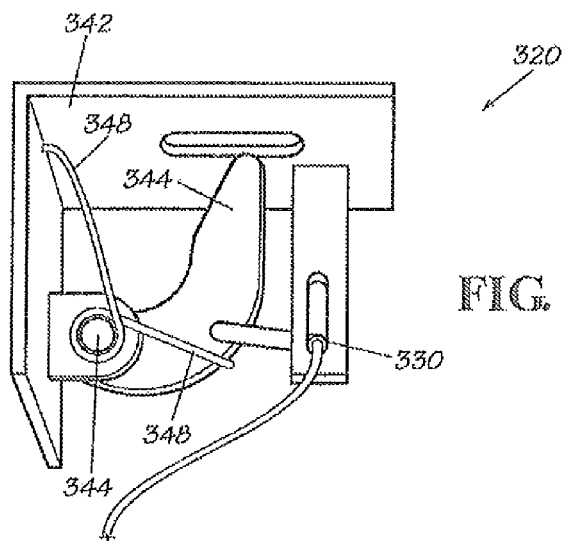
FIG. 16 illustrates the trigger assembly of FIG. 15 when the trigger assembly has been tripped.

FIG. 16, on the other hand, shows the orientation of the trigger lever 340 when the trigger assembly 320 has been tripped. A predetermined force of the flake upon the distal end of the trigger lever 340 inside the stuffer chute 90 causes the trigger lever 340 to pivot such that a greater portion of the trigger lever 340 extends to the exterior of the stuffer chute 90 where the trigger lever 340 comes into contact with a position sensor or contact switch 330 of the trigger assembly 320. When sensor/switch 330 is closed the circuit is completed to an electronic solenoid, hydraulic cylinder, actuator or motor 352 of the stuffer clutch assembly 310. Preferably a continuously variable analog position sensor would allow intelligent timing so that the stuffer can be tripped at the closest position to the set point instead only after the set point had been passed.

Movement initiated by the trigger assembly 320 and the completing of the circuit, such as the rotation of the motor 352, trips the linkage of the stuffer clutch assembly 310. The linkage of the stuffer clutch assembly 310 includes a first arm 350 coupled at one end to the motor 352. Coupled to the first arm 350 is a second arm 354. The second arm 354 pivots at point 356. The first and second arms 350, 354 are coupled together with a pin 360 in one of the first and second arms 350, 354 which is received in and slidably engages a slot 362 in the other of the arms 350, 354 so that a range of motion is provided to prevent the motor 352 from binding. A spring 366 in coupled between the distal end of first arm 350 and a point in between the pivot 356 and the position along the length of the second arm 354 where the pin 360 engages the slot 362. In the home position of the stuffer clutch assembly 310, a notch 370 on an end of a trip arm 372 receives and retains a roller 374 on the distal end of second arm 354. When the trigger assembly 320 is tripped and the motor 352 is energized, the point at which the first arm 350 is coupled to the motor 352 begins to rotate and the roller 374 of second arm 354 is released from the notch 370 of trip arm 372. Another roller 378 at the opposite end of trip arm 372 then engages the inner diameter of a rotating sprocket 380. Preferably, one revolution of the motor 352 releases the roller 374 from the notch 370 so that the trip arm 372 engages the sprocket 380 which in turn rotates a clutch pawl 382 of the stuffer clutch assembly 310 to put a stuffer arm 384 in motion, and then returns the stuffer clutch assembly 310 to the home position with the roller 374 of arm 354 received in notch 370. In an alternative embodiment, a hydraulic cylinder may be used instead of the motor 352. The hydraulic cylinder can be extended in order to move the arms 350, 354 and release the roller 374 from the notch 370 of the trip arm 372.

Figure 17:
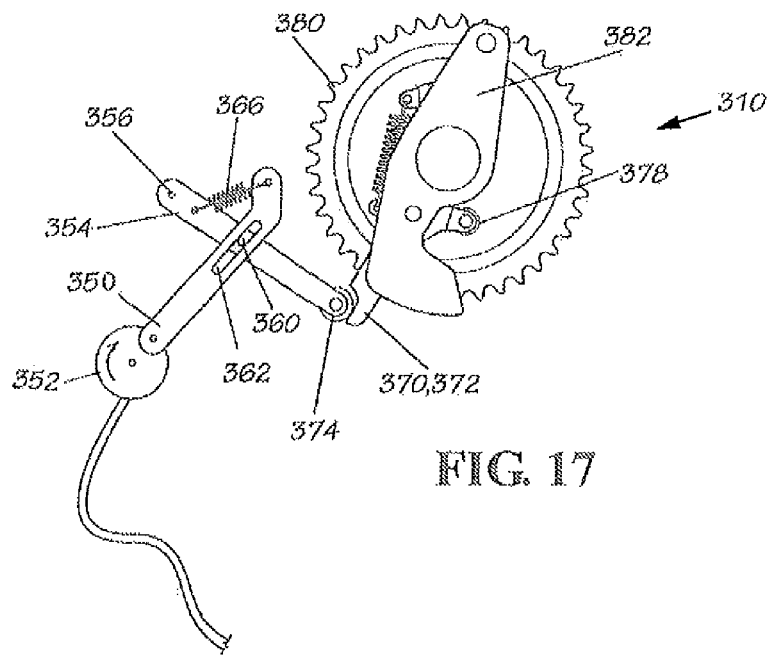
FIG. 17 illustrates the stuffer arm of a stuffer of the baler rotated into the home position.

In one or more embodiments, in order for the motor 352 to rotate, two conditions preferably are met. First, the stuffer arm 384 of the stuffer 280 must be in the home position as shown in FIG. 17. A contact switch or position sensor may be used to detect when the stuffer arm 384 is in the home position. Second, the trigger lever 340 in the sidewall of the stuffer chute 90 senses a charge in the stuffer chute 90 closing the switch 330 of the trigger assembly 320. When both of these conditions are net, the motor 352 turns allowing the roller 374 to drop off and fire the stuffer 280 one time. As soon as one of these two conditions is no longer met, the trip arm 372 goes back into a recessed position with its roller 374 retained in notch 370. Once the stuffer 280 leaves its home position, the motor 352 resets the stuffer clutch assembly 310 to neutral and awaits the next occurrence when both conditions are met again. After the stuffer 280 moves the flake to the baling chamber 86, the switch 330 of the trigger assembly 320 opens and is ready to sense the next flake formation. The electric tripping of the stuffer mechanism lends itself to finer control than the conventional mechanical linkages which is desirable when baling MOG or other material which easily may become an obstruction in the stuffer chute 90.

As shown in FIG. 1, the combine 10 may include a chopper 410. The chopper 410 preferably is a crop residue or MOG chopper for receiving straw and other residue from the combine 10, and propelling or projecting it outward from the combine 10 as denoted by the trajectory path 420 by rotation of the chopper 410. The chopper 410 is distinguishable from conventional choppers because chopper 410 includes dual knifes.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A density control mechanism for a baler comprising:
   a trigger assembly positioned through a stuffer chute of said baler for checking the density of material received in a stuffer chute of said baler, said trigger assembly adapted to initiate the sweeping of a charge of material from said stuffer chute when the desired density of material is received in said stuffer chute; and
   a stuffer clutch assembly comprising first and second arms coupled together wherein an end of said first arm is adapted for movement to release an end of said second arm from contact with a trigger arm, said trigger arm contacting a rotating sprocket of said baler when said trigger arm no longer contacts said second arm, whereby the charge of material is swept from said stuffer chute, wherein said first and second arms are coupled together by a pin in one of said arms received and slidably retained in a slot in the other of said arms.

2. The density control mechanism of claim 1 wherein a portion of said trigger assembly extends into an interior of said stuffer chute and the force of the material within said stuffer chute causes the portion of said trigger assembly extending into said interior of said stuffer chute to be pushed to the exterior to initiate the sweeping of the material from said stuffer chute.

3. The density control mechanism of claim 1 wherein said trigger assembly comprises a lever extending partially into said interior of said stuffer chute and a predetermined force from said material within said stuffer chute causes said lever to initiate the sweeping of the material from said stuffer chute.

4. A density control mechanism for a baler comprising:
   a trigger assembly positioned through a stuffer chute of said baler for checking the density of material received in a stuffer chute of said baler, said trigger assembly adapted to initiate the sweeping of a charge of material from said stuffer chute when the desired density of material is received in said stuffer chute; and a stuffer clutch assembly comprising first and second arms coupled together wherein an end of said first arm is adapted for movement to release an end of said second arm from contact with a trigger arm, said trigger arm contacting a rotating sprocket of said baler when said trigger arm no longer contacts said second arm, whereby the charge of material is swept from said stuffer chute, wherein the other end of said second arm is fixed about a pivot point and a spring is attached between said first and second arms.

5. The density control mechanism of claim 4 wherein a portion of said trigger assembly extends into an interior of said stuffer chute and the force of the material within said stuffer chute causes the portion of said trigger assembly extending into said interior of said stuffer chute to be pushed to the exterior to initiate the sweeping of the material from said stuffer chute.

6. The density control mechanism of claim 4 wherein said trigger assembly comprises a lever extending partially into said interior of said stuffer chute and a predetermined force from said material within said stuffer chute causes said lever to initiate the sweeping of the material from said stuffer chute.

7. The density control mechanism of claim 4 wherein said end of said first arm is coupled to a motor for rotational movement.

\* \* \* \* \*